(12) United States Patent
Shi et al.

(10) Patent No.: US 9,138,968 B2
(45) Date of Patent: Sep. 22, 2015

(54) PACKAGING AND MATERIALS FOR MAKING SAME

(75) Inventors: Yu Shi, Branchburg, NJ (US); Todd D. Van Gordon, Basking Ridge, NJ (US); Jun Wang, Fort Washington, PA (US); Kai Wang, Guangdong (CN)

(73) Assignee: Colgate-Palmolive Company, New York, NY (US)

( * ) Notice: Subject to any disclaimer, the term of this patent is extended or adjusted under 35 U.S.C. 154(b) by 0 days.

(21) Appl. No.: 14/003,571

(22) PCT Filed: Mar. 2, 2012

(86) PCT No.: PCT/CN2012/071846
§ 371 (c)(1),
(2), (4) Date: Sep. 6, 2013

(87) PCT Pub. No.: WO2012/122898
PCT Pub. Date: Sep. 20, 2012

(65) Prior Publication Data
US 2013/0333787 A1    Dec. 19, 2013

Related U.S. Application Data

(60) Provisional application No. 61/451,945, filed on Mar. 11, 2011.

(51) Int. Cl.
| | |
|---|---|
| *B32B 23/04* | (2006.01) |
| *B32B 1/08* | (2006.01) |
| *B32B 7/12* | (2006.01) |
| *B32B 9/02* | (2006.01) |
| *B32B 15/08* | (2006.01) |
| *B32B 27/08* | (2006.01) |
| *B32B 27/30* | (2006.01) |
| *B32B 27/32* | (2006.01) |
| *B32B 27/34* | (2006.01) |
| *B32B 27/36* | (2006.01) |
| *B32B 23/06* | (2006.01) |
| *B32B 27/10* | (2006.01) |
| *B32B 23/08* | (2006.01) |

(52) U.S. Cl.
CPC .............. *B32B 23/046* (2013.01); *B32B 1/08* (2013.01); *B32B 7/12* (2013.01); *B32B 9/02* (2013.01); *B32B 15/08* (2013.01); *B32B 23/06* (2013.01); *B32B 23/08* (2013.01); *B32B 27/08* (2013.01); *B32B 27/10* (2013.01); *B32B 27/306* (2013.01); *B32B 27/32* (2013.01); *B32B 27/34* (2013.01); *B32B 27/36* (2013.01); *B32B 2272/00* (2013.01); *B32B 2307/7242* (2013.01); *B32B 2439/40* (2013.01); *B32B 2555/00* (2013.01); *B32B 2597/00* (2013.01); *Y10T 428/3179* (2015.04); *Y10T 428/31703* (2015.04); *Y10T 428/31739* (2015.04); *Y10T 428/31895* (2015.04); *Y10T 428/31902* (2015.04); *Y10T 428/31971* (2015.04)

(58) Field of Classification Search
CPC ............................ B32B 27/32; B32B 27/327
USPC ......... 428/34.1–35.4, 35.7–35.9, 36.4–36.91, 428/457, 458, 461, 464, 474.4, 428/475.5–476.3, 480–483, 500, 507, 428/511–523
See application file for complete search history.

(56) References Cited

U.S. PATENT DOCUMENTS

| | | | |
|---|---|---|---|
| 4,139,665 A | 2/1979 | Herrero | |
| 4,784,863 A * | 11/1988 | Lustig et al. | ................... 426/113 |
| 5,213,858 A | 5/1993 | Tanner et al. | |
| 5,491,011 A | 2/1996 | Pezzoli et al. | |
| 5,702,033 A | 12/1997 | Beaver | |
| 6,117,506 A | 9/2000 | Graboski et al. | |
| 6,242,102 B1 | 6/2001 | Tomka | |
| 6,692,801 B1 | 2/2004 | Berlin et al. | |
| 7,740,149 B2 | 6/2010 | Luburic | |
| 7,951,436 B2 | 5/2011 | Knoerzer et al. | |
| 8,697,245 B2 | 4/2014 | Khemani et al. | |
| 2003/0008089 A1 | 1/2003 | Mueller et al. | |
| 2006/0032866 A1 | 2/2006 | Labbe et al. | |
| 2007/0187429 A1 | 8/2007 | Farahmand | |
| 2008/0035999 A1 | 2/2008 | Kim et al. | |
| 2009/0048368 A1 | 2/2009 | Bash et al. | |
| 2009/0206524 A1 | 8/2009 | Laidler et al. | |
| 2011/0135912 A1 | 6/2011 | Xu | |
| 2013/0315416 A1 | 11/2013 | Nakayama | |

FOREIGN PATENT DOCUMENTS

| | | |
|---|---|---|
| CA | 2532842 | 8/2006 |
| CN | 1071878 | 5/1993 |
| EP | 1 004 515 | 5/2000 |
| JP | S63120643 | 11/1986 |
| JP | H06-126897 | 5/1994 |
| JP | 2010-253803 | 11/2010 |
| JP | 2011-016244 | 1/2011 |
| WO | WO 02/064366 | 8/2002 |
| WO | WO 2006/042364 | 4/2006 |
| WO | WO 2006/060154 | 6/2006 |
| WO | WO 2009157931 | 12/2009 |
| WO | WO 2011009165 | 1/2011 |

OTHER PUBLICATIONS

International Search Report and the Written Opinion of the International Searching Authority issued in International Application PCT/CN2012/071846 mailed Jun. 14, 2012.
Terraloy, Thermoplastic Starch (TPS) Bioplastic Compounds, Starch Blend Technology, Teknor Apex fact sheet, date unknown, but prior to the date of the subject application.
CN Search Report dated Sep. 6, 2014 for corresponding CN Application No. 201280012883.7.
Official Action dated Oct. 17, 2014 in corresponding RU Application No. 2013145552. RU.

\* cited by examiner

*Primary Examiner* — Walter B Aughenbaugh

(57) ABSTRACT

The invention provides a novel flexible, substantially gas impermeable laminate material comprising starch/polymer blends, which can be used to make dispensing tubes, e.g., for toothpaste, which material is light, resilient, and inexpensive, which can be made almost entirely from renewable materials, and which can be recycled.

4 Claims, No Drawings

PACKAGING AND MATERIALS FOR MAKING SAME

CROSS-REFERENCE TO RELATED PATENT APPLICATIONS

The present application is a U.S. national stage application under 35 U.S.C. §371of PCT Application No. PCT/CN2012/071846, filed Mar. 2, 2012, which claims the benefit under 35 U.S.C. 119(e) of U.S. provisional application 61/451,945 filed Mar. 11, 2011, the entireties of which are incorporated herein by reference.

CROSS-REFERENCE TO RELATED APPLICATIONS

This application claims the benefit of U.S. Provisional Application No. 61/451,945, filed Mar. 11, 2011. The disclosure of the above application is incorporated herein by reference.

FIELD OF THE INVENTION

The invention relates to novel deformable laminate materials and to containers made therewith, for example dispensing tubes for toothpaste, cosmetics, condiments, glues, and other materials having the consistency of a paste, gel or cream.

BACKGROUND OF THE INVENTION

Dispensing tubes present significant technical challenges. They need to be substantially impermeable to and not react with their contents. Toothpaste, for example, may contain volatile or reactive components such as active ingredients, water, salts, metal ions, sweeteners, and volatile flavorings. The tubes should protect the contents from light, as components may degrade in the presence of light, particularly UV light. Preferably the tubes should be rugged, able to withstand the rigors of transport, temperature variation, and use by consumers. The tubes are preferably thin enough to be readily deformable, so the paste can be easily squeezed out of the tube, yet tough enough to withstand significant pressures in filling and in use. Finally, the materials and manufacturing costs should be as low as possible, as packaging may constitute a significant fraction of the cost of goods for many products using dispensing tubes.

There is a need for dispensing tubes that provide performance equal to or better than existing tubes, but which are also environmentally friendly and inexpensive.

SUMMARY OF THE INVENTION

The invention provides, inter alia, a novel flexible, substantially gas impermeable laminate material, comprising an inner polymer layer, a substantially gas impermeable barrier layer, and an outer polymer layer, wherein the outer polymer layer comprises starch, e.g., Laminate 1 and 2, described below, which can be used to make dispensing tubes which are lighter and less susceptible to cracking or leaking than aluminum, which can be made almost entirely from renewable materials, which replaces non-renewable materials such as plastics made from petrochemical sources.

A multi-layered toothpaste tube containing renewable material is unique in that the superior function of the various layers is preserved but with the added benefit that reduced reliance on petroleum-based materials results in improved sustainability, reduced cost of goods and reduced impact on the environment through the product's life cycle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE INVENTION

The invention provides in a first embodiment, a novel flexible, substantially gas impermeable laminate material, comprising an inner polymer layer, a substantially gas impermeable barrier layer, and an outer polymer layer, wherein the outer polymer layer comprises starch, e.g. a starch/polyethylene blend with starch percentage at least 40%, e.g., 50-70% or about 60%.

For example, in one embodiment, the invention provides a novel flexible, substantially gas impermeable laminate material, Laminate 1, comprising the following layers (from inner layer, which in use would be in direct contact with contents, to outside layer):

a. Inner layer of non-reactive resin film, for example linear low density polyethylene (LLDPE);
b. Optional layer of resin film, e.g., selected from
  i. low density polyethylene (LDPE);
  ii. low density polyethylene blended with modified starch;
  iii. a plastic film layer comprising one or more layers of low density polyethylene blended with modified starch and one or more layers of low density polyethylene (LDPE); and
  iv. a triple layer comprising
    1. low density polyethylene optionally blended with modified starch
    2. thermoplastic starch
    3. low density polyethylene optionally blended with modified starch;
c. Optional tie layer, e.g., of adhesive resin material, e.g., comprising anhydride modified polyolefins or ethylene acid copolymer;
d. Barrier layer made of material which is substantially gas impermeable, e.g., impermeable to water vapor and oxygen, e.g., selected from
  i. aluminum foil, e.g., recycled aluminum foil;
  ii. metalized poly(lactic acid);
  iii. poly(lactic acid) (PLA);
  iv. metalized paper;
  v. resin-coated paper, e.g., paper coated with ethylene vinyl alcohol copolymer (EVOH);
  vi. ethylene vinyl alcohol copolymer film;
  vii. nylon;
  viii. metalized polyester, e.g., poly(ethylene terephthalate) (PET) and poly(ethylene naphthalate) (PEN);
e. Optional tie layer, e.g., of adhesive resin material, e.g., comprising anhydride modified polyolefins or ethylene acid copolymer;
f. Outer layer of resin film, e.g., selected from
  i. low density polyethylene blended with modified starch;
  ii. a plastic film comprising one or more layers of low density polyethylene blended with modified starch and one or more layers of low density polyethylene (LDPE);

iii. a triple layer comprising
   1. low density polyethylene optionally blended with modified starch
   2. thermoplastic starch
   3. low density polyethylene optionally blended with modified starch;
g. Optional labeling layer, e.g., comprising a white polyethylene film, e.g., with a sealing characteristic.

The invention thus provides various embodiments of Laminate 1, e.g., 1.1. Laminate 1 when the barrier layer (d) is selected from resin-coated paper, e.g., paper coated with ethylene vinyl alcohol copolymer (EVOH) and ethylene vinyl alcohol copolymer film;
1.2. Laminate 1 or 1.1 wherein the inner layer (a) comprises linear low density polyethylene film;
1.3. Any of the foregoing laminates wherein layer b and layer c are co-extruded and/or layer e and layer f are coextruded;
1.4. Any of the foregoing laminates wherein the optional layers of resin film (b) is present and comprise low-density polyethylene film;
1.5. Any of the foregoing laminates comprising low-density polyethylene mixed with modified starch, wherein the starch is modified to reduce its hydrophilicity, e.g., by reaction with hydroxyl groups on the starch, e.g., by esterification with hydrophobic residues;
1.6. The preceding laminate wherein the total starch content of layer of resin film (b) and/or (f) is at least 40%;
1.7. Any of the foregoing laminates wherein resin film (b) is present and comprises low density polyethylene blended with modified starch; or a triple layer comprising
   1. low density polyethylene optionally blended with modified starch
   2. thermoplastic starch
   3. low density polyethylene optionally blended with modified starch;
1.8. Any of the foregoing laminates wherein the total starch content of the laminate is at least 40%;
1.9. Any of the foregoing laminates wherein the optional layers of resin film (b) and/or (f) are present and comprise a biodegradable or renewable resin;
1.10. Any of the foregoing laminates wherein the optional layers of resin film (b) and/or (f) are present and comprise a resin made from recycled plastic;
1.11. Any of the foregoing laminates wherein the optional layers of resin film (b) and/or (f) are present and comprise low density polyethylene made from ethanol derived monomers that have been polymerized to make chemically identical polyolefin;
1.12. Any of the foregoing laminates wherein the tie layers (c) and (e) comprise anhydride modified polyolefins;
1.13. Any of the foregoing laminates wherein the tie layers (c) and (e) comprise an ethylene acid copolymer, e.g., ethylene acrylic acid copolymer or ethylene methacrylic acid copolymer;
1.14. Any of the foregoing laminates wherein the barrier layer (d) is recycled aluminum foil.
1.15. Any of the foregoing laminates wherein the barrier layer (d) comprises metalized poly(lactic acid);
1.16. Any of the foregoing laminates wherein the barrier layer (d) comprises poly(lactic acid) (PLA);
1.17. Any of the foregoing laminates wherein the barrier layer comprises poly(lactic acid) (PLA) coated with ethylene vinyl alcohol copolymer (EVOH);
1.18. Any of the foregoing laminates wherein the barrier layer (d) comprises metalized paper;
1.19. Any of the foregoing laminates wherein the barrier layer (d) comprises resin-coated paper;
1.20. Any of the foregoing laminates wherein the barrier layer (d) comprises paper coated with ethylene vinyl alcohol copolymer (EVOH);
1.21. Any of the foregoing laminates wherein the barrier layer (d) comprises ethylene vinyl alcohol copolymer (EVOH) film;
1.22. Any of the foregoing laminates wherein the barrier layer (d) comprises nylon;
1.23. Any of the foregoing laminates wherein the barrier layer (d) comprises nylon made from renewable materials, e.g., comprising monomers from sebacic acid;
1.24. Any of the foregoing laminates wherein the barrier layer (d) comprises metalized polyester, e.g., poly(ethylene terephthalate) (PET) and poly(ethylene naphthalate) (PEN);
1.25. Any of the foregoing laminates wherein the outer layer (g) comprises polyethylene, e.g., white polyethylene;
1.26. Any of the foregoing laminates which is substantially recyclable;
1.27. Any of the foregoing laminates which is substantially biodegradeable.

In another embodiment, the invention provides a novel flexible, substantially gas impermeable laminate material, Laminate 2, comprising the following layers (from inner layer, which in use would be in direct contact with contents, to outside layer):

a. Inner layer of non-reactive resin film, for example linear low density polyethylene (LLDPE);
b. Optional layer of resin film, e.g., selected from
   i. low density polyethylene (LDPE);
   ii. low density polyethylene blended with modified starch;
   iii. a plastic film layer comprising one or more layers of low density polyethylene blended with modified starch and one or more layers of low density polyethylene (LDPE); and
   iv. a triple layer comprising
      1. low density polyethylene optionally blended with modified starch
      2. thermoplastic starch
      3. low density polyethylene optionally blended with modified starch;
c. Optional tie layer, e.g., of adhesive resin material, e.g., comprising anhydride modified polyolefins or ethylene acid copolymer;
d. Barrier layer made of material which is substantially gas impermeable, e.g., impermeable to water vapor and oxygen, e.g., selected from
   i. aluminum foil, e.g., recycled aluminum foil;
   ii. metalized poly(lactic acid);
   iii. poly(lactic acid) (PLA);
   iv. metalized paper;
   v. resin-coated paper, e.g., paper coated with ethylene vinyl alcohol copolymer (EVOH);
   vi. ethylene vinyl alcohol copolymer film;
   vii. nylon;
   viii. metalized polyester, e.g., poly(ethylene terephthalate) (PET) and poly(ethylene naphthalate) (PEN);
e. Optional tie layer, e.g., of adhesive resin material, e.g., comprising anhydride modified polyolefins or ethylene acid copolymer;

f. An outer layer or multilayer comprising a starch/polyethylene blend with starch percentage at least 40%, e.g., 50-70% or about 60%, e.g., a plastic film comprising one or more layers of low density polyethylene blended with modified starch and one or more layers of low density polyethylene (LDPE); for example comprising a triple layer (from inner to outer)
  1. Starch/polyethylene blend with starch percentage 50-70% or about 60%;
  2. Starch/polyethylene blend with starch percentage 50-70% or about 60%; and with 8 weight percent pigment; and
  3. Linear low density polyethylene and/or low density polyethylene;
g. Optional label layer, e.g., comprising white polyethylene, e.g., optionally comprising sealant.

The invention thus provides various embodiments of Laminate 2, e.g., 2.

2.1. Laminate 2 when the barrier layer (d) is selected from resin-coated paper, e.g., paper coated with ethylene vinyl alcohol copolymer (EVOH) and ethylene vinyl alcohol copolymer film;
2.2. Laminate 2 or 2.1 wherein the inner layer (a) comprises linear low density polyethylene film;
2.3. Any of the foregoing laminates wherein layer b and layer c are co-extruded and/or layer e and layer f are coextruded;
2.4. Any of the foregoing laminates wherein the optional layers of resin film (b) is present and comprises low-density polyethylene film;
2.5. Any of the foregoing laminates wherein the resin film (b) is present and comprise low-density polyethylene mixed with modified starch, wherein the starch is modified to reduce its hydrophilicity, e.g., by reaction with hydroxy groups on the starch, e.g., by esterification with hydrophobic residues;
2.6. The preceding laminate wherein the total starch content of layer of resin film (b) is at least 40%;
2.7. Any of the foregoing laminates wherein the total starch content of the laminate is at least 40%;
2.8. Any of the foregoing laminates wherein the optional layers of resin film (b) are present and comprises a biodegradable resin;
2.9. Any of the foregoing laminates wherein the optional layers of resin film (b) are present and comprise a resin made from recycled plastic;
2.10. Any of the foregoing laminates wherein the optional layer of resin film (b) are present and comprises low density polyethylene made from ethanol derived monomers that have been polymerized to make chemically identical polyolefin;
2.11. Any of the foregoing laminates wherein the tie layers (c) and (e) comprise anhydride modified polyolefins;
2.12. Any of the foregoing laminates wherein the tie layers (c) and (e) comprise an ethylene acid copolymer, e.g., ethylene acrylic acid copolymer or ethylene methacrylic acid copolymer;
2.13. Any of the foregoing laminates wherein the barrier layer (d) is recycled aluminum foil.
2.14. Any of the foregoing laminates wherein the barrier layer (d) comprises metalized poly(lactic acid);
2.15. Any of the foregoing laminates wherein the barrier layer (d) comprises poly(lactic acid) (PLA);
2.16. Any of the foregoing laminates wherein the barrier layer comprises poly(lactic acid) (PLA) coated with ethylene vinyl alcohol copolymer (EVOH);
2.17. Any of the foregoing laminates wherein the barrier layer (d) comprises metalized paper;
2.18. Any of the foregoing laminates wherein the barrier layer (d) comprises resin-coated paper;
2.19. Any of the foregoing laminates wherein the barrier layer (d) comprises paper coated with ethylene vinyl alcohol copolymer (EVOH);
2.20. Any of the foregoing laminates wherein the barrier layer (d) comprises ethylene vinyl alcohol copolymer (EVOH) film;
2.21. Any of the foregoing laminates wherein the barrier layer (d) comprises nylon;
2.22. Any of the foregoing laminates wherein the barrier layer (d) comprises metalized polyester, e.g., poly(ethylene terephthalate) (PET) and poly(ethylene naphthalate) (PEN);
2.23. Any of the foregoing laminates wherein the barrier layer (d) comprises nylon made from renewable materials, e.g., comprising monomers from sebacic acid;
2.24. Any of the foregoing laminates wherein the outer layer (g) is present and comprises polyethylene, e.g., white polyethylene;
2.25. Any of the foregoing laminates which is substantially recyclable;
2.26. Any of the foregoing laminates which is substantially biodegradeable.

The invention further provides a dispensing tube comprising a laminate as described above, e.g., comprising a flexible, substantially gas impermeable laminate material, comprising an inner polymer layer, a substantially gas impermeable barrier layer, and an outer polymer layer, wherein the outer polymer layer comprises starch, e.g. a starch/polyethylene blend with starch percentage at least 40%, e.g., 50-70% or about 60% (Laminates of the Invention); for example a laminate selected from the foregoing Laminate 1, et. seq. or Laminate 2, et. seq. In one embodiment (Container 1), the dispensing tube comprises a tube having top end, a bottom end and a flexible wall made of a Laminate of the Invention, wherein the wall at the bottom end is crimped to form a seal, and wherein the top end has a shoulder sealed to and approximately perpendicular to the wall, wherein the shoulder is made of a material which is more rigid than the wall, the shoulder comprising or providing support for a nozzle, and the nozzle having a cap, such that the container may be sealed. The invention thus provides various embodiments of Container 1, e.g., 3.1. Container 1 wherein the shoulder is made of high density polyethylene (HDPE);
3.2. The foregoing container wherein the HDPE is reprocessed HDPE;
3.3. Any of the foregoing containers wherein the wall further comprises interior ribs, e.g., to provide additional strength and resistance to cracking;
3.4. Any of the foregoing containers comprising a flavor barrier insert which separates the contents of the container from the shoulder material;
3.5. The foregoing container wherein the flavor barrier insert is made of renewable materials, e.g., reprocessed poly(ethylene terephthalate) (RPET);
3.6. Any of the foregoing containers wherein the cap is made from recyclable or renewable materials, e.g., recycled polypropylene;
3.7. Any of the foregoing materials wherein the cap is made from PLA resin optionally coated with aluminum;
3.8. Any of the foregoing containers wherein the cap is made from biodegradable materials, e.g., a resin mixed with at least 40% starch, preferably at least 50% starch;

3.9. Any of the foregoing containers wherein the entire container is recyclable.

3.10. Any of the foregoing containers where the container includes about 25% by weight of renewable or recycled materials.

In a further embodiment, the invention provides a toothpaste product, comprising toothpaste in a container according to any of the embodiments described for Container 1.

In a further embodiment, the invention provides a method of recycling plastic laminate toothpaste tubes, e.g., according to any of the embodiments described for Container 1, comprising selling toothpaste to consumers, accepting the tubes back from consumers after use, and recycling the tubes into resin-based products.

The following abbreviations are used from time to time in the specification:
Al: aluminum
EAA: Ethylene—acrylic acid copolymer
EVOH: ethylene vinyl alcohol copolymer
HDPE: High density polyethylene
LDPE: Low density polyethylene
LLDPE: Linear low density polyethylene
PE: Polyethylene
PP: Polypropylene
PET: poly(ethylene terephthalate)
PLA: poly(lactic acid)
TPS: Thermoplastic starch Preferred materials include the use of modified starch as a filler for PP or PE. Starch may be used in injection molded caps, as well as in starch filled films. Other renewable based materials such as seeds, bamboo, plant fiber, etc. can be fillers as well.

In one embodiment, laminates are made as follows: Bubble blown film is made by extruding a thin circular ring of plastic that is drawn up into an inflated bubble. The thickness is programmed with a combination of die gap and rotating tenting rollers. The bubble is collapsed at the top of the tenting assembly into a role that is rotated around the bubble for thickness control and distribution within the roll. Very wide sheets can be made this way. Cast films are made as a flat sheet extruded and drawn from a straight die nip onto a chilled roller. The thickness control is better with this making process than with the bubble blowing process.

In one embodiment, the outer PE layer in the tube laminate is a complex arrangement of blown film and molten extruded PE for special printing and sealing function. The inner cast PE film is laminated with coextrusion to a tie layer of EAA and on to an aluminum foil layer. The EAA tie layer is matched on the outer side of the aluminum foil as well. The layers come together at the factory in one pass through the lamination machine.

The laminate is transferred to the tube making machine to be formed into the tube sidewalls and welded to the shoulder making the nozzle. The overall thickness is 100 to 500 microns.

In some embodiments, one or more layers of the laminate contain high proportions of starch. Starch is the least expensive biopolymer on the market, and indeed is only about a quarter the price of polyethylene. Thus, by developing high performance laminates which also have high percentages of starch, Applicants are able to reduce reliance on petroleum-derived polymers, and also reduce costs "Modified starch" for use in this invention includes starch which has been modified to enhance its compatibility in a blend with a polymer, for example by plasticizing starch to break down its crystalline structure and optionally chemically modifying the starch to reduce its hydrophilicity. Starch/plastic blends for use in the present invention preferably utilize pre-plasticized starch. If native starch granules are simply blended with synthetic polymers as fillers, plasticizers added, and there are no other modifications done on the starch, the highest percentage of starch that could be integrated into such compounds is 15-20% due to the high crystallinity of starch and its poor compatibility with synthetic polymers. Therefore the starch is plasticized to destroy its crystallinity to certain level, which makes the starch more easily thermoprocessed. The plasticized starch is then blended with some polymers with hydrophilic functional groups (e.g., hydroxyl, carboxyl groups) that can react with hydroxyl groups on starch, or with small molecular compatibilizers. The starch content of these compounds can reach 50-80%. For example, in a blend of plasticized starch with PE, the starch content is e.g. about 60 wt % in the compound. In one embodiment, only the outer or penultimate film layer is modified with starch/PE compound to minimize the potential interference of such modification to the packaged toothpaste. The outer layers do not contact directly with the toothpaste and are separated from it by the barrier layer.

In other embodiments, the invention uses thermoplastically processable starch, TPS, in one or more layers. TPS is a 100% starch material which can be blended with different synthetic polymers. As described in U.S. Pat. No. 5,362,777, in order to produce TPS, a plasticizer is mixed with native starch and the mixture is caused to melt by the application of heat and mechanical energy. After the mixture of starch and the plasticizer is molten, the melt is mixed until it is at least almost homogeneous. The mixing process is executed without the presence of water.

The foregoing description of preferred embodiments is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

EXAMPLE 1

Toothpaste tubes are prepared using renewable and recyclable materials, then tested for performance. Laminates are prepared having the following configurations, from inside to outside:

a. LLDPE/LDPE/tie layer/recycled Al foil/tie layer/LDPE/white PE blend
b. LLDPE/LDPE from ethanol/tie layer/metalized PLA/tie layer/LDPE from ethanol/white PE blend reprocessed HDPE
c. LLDPE/LDPE from ethanol/tie layer/PLA/tie layer/LDPE from ethanol/white PE blend reprocessed HDPE
d. LLDPE/LDPE from ethanol/tie layer/metalized paper/tie layer/LDPE from ethanol/white PE blend reprocessed HDPE
e. LLDPE/LDPE from ethanol/tie layer/EVOH coated paper (2 sides)/tie layer/LDPE from ethanol/white PE blend reprocessed HDPE f. LLDPE/LDPE with starch loading/tie layer/renewable nylon barrier/tie layer/LDPE with starch loading/white PE blend Modification to the top end of the tube includes using reprocessed PET in the flavor barrier insert. Expected stress cracking behavior in the insert is improved with the design change including interior ribs to provide hoop strength and more resistance to stress cracking. Caps are made with recycled PP resin as opposed to virgin resin. Alternatively the caps are made of PLA resin and sputter coated with aluminum for better barrier is needed. The HDPE shoulder is made with reprocessed HDPE that passes a safety and aesthetic screening (aging study). In combination with reprocessed PET or another polyester any migration concerns from the reprocessed HDPE are removed.

Renewable PE made from sugarcane ethanol or other renewable sources is available from Braskem or Dow Chemical. Where aluminum foil is used as the barrier layer, recycled aluminum foil is used. Options to replace aluminum foil as barrier include PLA or metalized PLA, metalized paper, EVOH coated paper, EVOH coated PLA film, or metalized polyester, e.g., PET and PEN;

Finally, nylon from renewable sources, e.g. made using sebacic acid, is tested as a barrier material.

Starch filling, mixing the resins with modified starch to reduce the amount of plastic and enhance biodegradability, is also evaluated, by starch filling the internal LDPE layers and by making the cap resin 50% filled with starch.

EXAMPLE 2

Tubes are made using the following laminate structure (outside to inside):

| Component/material | Process for making layer | Thickness (microns) |
| --- | --- | --- |
| White PE | Blown Film | 120 |
| LDPE | extruded | 40 |
| EAA | extruded | |
| Aluminum | foil | 12 |
| EAA | extruded | 40 |
| LDPE | extruded | |
| LLDPE/LDPE | Cast Film | 38 |
| TOTAL | | 250 |

Starch filling, mixing the resins with modified starch to reduce the amount of plastic and enhance biodegradability, is also evaluated, by starch filling the internal LDPE layers.

EXAMPLE 3

Tubes are made using the following laminate structure (outside to inside):

| Component/material | Thickness (microns) |
| --- | --- |
| White PE | 120-130 |
| LDPE | 18-28 |
| LDPE/EAA | 15-25/7-17 |
| EVOH | 10-20 |
| EAA/LDPE | 7-17/15-25 |
| LDPE | 18-28 |
| LLDPE sealant | 45-55 |
| TOTAL | ca. 300 (average) |

Starch filling, mixing the resins with modified starch to reduce the amount of plastic and enhance biodegradability, is also evaluated, by starch filling the internal LDPE layers.

Example 4

Tubes are made using the following laminate structure (outside to inside):

| Component/material | Thickness (microns) |
| --- | --- |
| White PE | 55-65 |
| LDPE + starch | 102-113 |
| EAA | 7-17 |
| EVOH | 10-20 |
| EAA | 7-17 |
| LDPE + starch | 38-48 |
| LLDPE sealant | 45-55 |
| TOTAL | ca. 300 (average) |

EXAMPLE 4

A laminate is made using a blend of plasticized starch with PE. The starch content is 60 wt % in the compound. Only the outer film is modified with starch/PE compound to minimize the potential interference of such modification to the packaged toothpaste. The outer film does not contact directly with the toothpaste and is separated from it by the barrier layer. The outer film laminate, which includes the starch/PE layer, is produced separately and then is laminated on the barrier layer. It has been found that when the outer most layer of LLDPE is not included, the outer film layer of the starch/PE blend breaks when extruded with the other layers to form the laminate. However, it has also been found that the inclusion of an addition outer film layer of LLDPE may provide structural support for the outer film layer of the starch/PE blend to prevent breakage during extrusion of the laminate. The modified structure in this embodiment is shown as follows, outside to inside:

Outer film layer 1 LLDPE
Outer film layer 2 92 wt %: starch/PE, starch 60%; 8 wt % pigment masterbatch
Outer film layer starch/PE, starch 60%
Tie layer: Co-extruded PE/EAA
Barrier layer—aluminum foil
Tie layer: Co-extruded PE/EAA
Inner film triple layer PE In this embodiment, the total outer film thickness is 185μ, with the outer film layer 1 and 3 of 27.5μ thick, respectively, and outer film layer 2 of 130μ. The starch/PE compound has a starch percent of 60%. The outer film is 3-layer co-extruded followed by film blowing.

This laminate is compare with a conventional laminate having a PE/barrier/PE structure with the tie layer in between PE and barrier. Both inner and outer PE layers have multiple-ply layers with different total thicknesses. The barrier layer is Al foil or other barrier materials. The tie layers are co-extruded PE/EAA layers to bond PE films onto the barrier layer.

The film properties of the outer films used in the novel laminate and the conventional laminate are compared in Table 1:

TABLE 1

Mechanical properties of the regular and outer films

| Film | Dart Impact (g) (GB9639-88) | Tear Strength (MPa) (GB/ T16578-96) MD | Tear Strength (MPa) (GB/ T16578-96) TD | Tensile Strength (MPa) (GB/ T13022-91) MD | Tensile Strength (MPa) (GB/ T13022-91) TD | Stiffness (N) (Internal Method) |
|---|---|---|---|---|---|---|
| Conventional outer film | 145 | 73 | 90 | 35 | 32 | 0.15 |
| Starch-outer film | 162 | 30 | 35 | 8.3 | 8.6 | 0.27 |

Toothpaste tubes are made using the laminate having the high-starch outer film. The tube properties are tested using the internal air burst, drop, inter-layer bond strength tests (Table 2) and found to be acceptable.

TABLE 2

Qualification tests on the starch tubes

Test For Web With Starch

| Sample | Air burst for empty tube(Spec >2.1 bar) | Individual Drop Test | MAX LOAD (Stiffness) (N) | Bond strength inner (Spec 4N) | Bond strength outer (Spec 4N) |
|---|---|---|---|---|---|
| 1 | 2.4 | pass | 2.155 | 8.393P | not detachable |
| 2 | 2.4 | pass | 2.372 | 8.663P | |
| 3 | 2.35 | pass | 2.238 | 8.666P | |
| 4 | 2.4 | pass | 2.313 | | |
| 5 | 2.4 | pass | 2.346 | | |
| 6 | 2.34 | pass | 2.165 | | |
| 7 | 2.4 | | Drop test all passed (3 times) | | |
| 6 | 2.4 | | | | |

EXAMPLE 5

Two Ply Laminate

In this example, the outer film has a two-ply structure and the PE in the co-extruded tie layer is eliminated. This is done due to the good compatibility between PE/starch compound and the EAA as well as to reduce more petroleum based material in the structure to increase the biobased material content. The structure from outside to inside is as follows:

Outer film layer 92 wt %: starch/PE, starch 60%; 8 wt % pigment masterbatch
Tie layer: EAA
Barrier layer - Aluminum foil
Tie layer: EAA
Inner film layer: LLDPE/sealant

What is claimed is:

1. A flexible laminate material, comprising an inner polymer layer, a barrier layer, and an outer polymer layer, wherein the outer polymer layer comprises starch; and
wherein:
   a. the inner layer is a linear low density polyethylene (LLDPE);
   b. the laminate material optionally has a layer of resin film which is selected from the group consisting of (i) a low density polyethylene (LDPE), (ii) low density polyethylene blended with modified starch and (iii) a triple layer comprising a layer comprising (1) low density polyethylene optionally blended with modified starch, a layer comprising (2) thermoplastic starch and a layer comprising (3) low density polyethylene optionally blended with modified starch
   c. the laminate material optionally has a tie layer comprising an ethylene acid copolymer between the optional layer of resin film or the inner layer and the barrier layer;
   d. the barrier layer is selected from the group consisting of:
      i. aluminum foil,
      ii. metalized poly(lactic acid),
      iii. poly(lactic acid),
      iv. metalized paper,
      v. paper coated with ethylene vinyl alcohol copolymer, and
      vi. nylon;
   e. the laminate material optionally has a tie layer comprising an ethylene acid copolymer between the barrier layer and the outer polymer layer;
   f. the outer polymer layer is selected from the group consisting of (i) low density polyethylene blended with modified starch and (ii) a plastic film comprising one or more layers of low density polyethylene blended with modified starch and one or more layers of low density polyethylene, wherein the starch content of the polyethylene blended with modified starch is 50%-70% by weight based on the weight of the polyethylene blended with modified starch; and
   the laminate material optionally has an outer label layer.

2. The laminate material of claim 1 wherein the laminate material has the layer of resin film which is selected from the group consisting of (i) a low density polyethylene (LDPE), (ii) low density polyethylene blended with modified starch and (iii) a triple layer comprising a layer comprising (1) low density polyethylene optionally blended with modified starch, a layer comprising (2) thermoplastic starch and a layer comprising (3) low density polyethylene optionally blended with modified starch and both tie layers comprise an ethylene-acrylic acid copolymer.

3. The laminate material of claim 2, wherein the barrier layer is aluminum foil or paper coated with ethylene vinyl alcohol copolymer.

4. The laminate material of claim 3, wherein the resin film consists of low density polyethylene.

* * * * *